May 16, 1939.                F. RANGLACK                2,158,150
           CASH REGISTER, ACCOUNTING, AND THE LIKE MACHINE
                   Filed Oct. 14, 1935         3 Sheets-Sheet 1
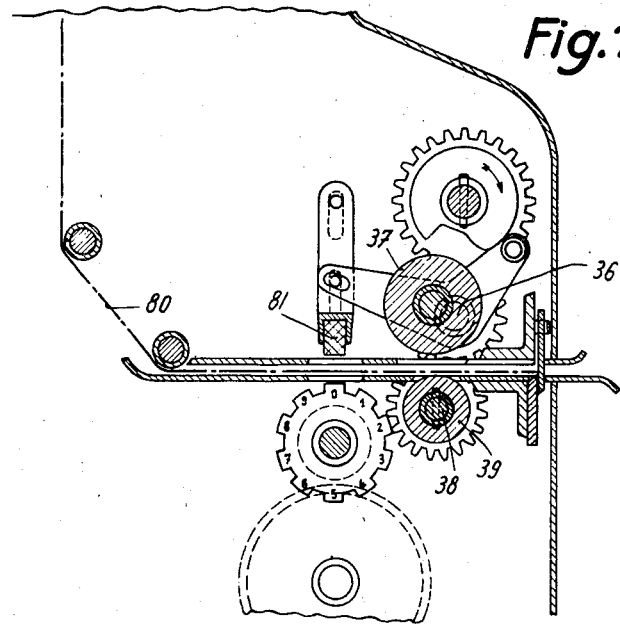
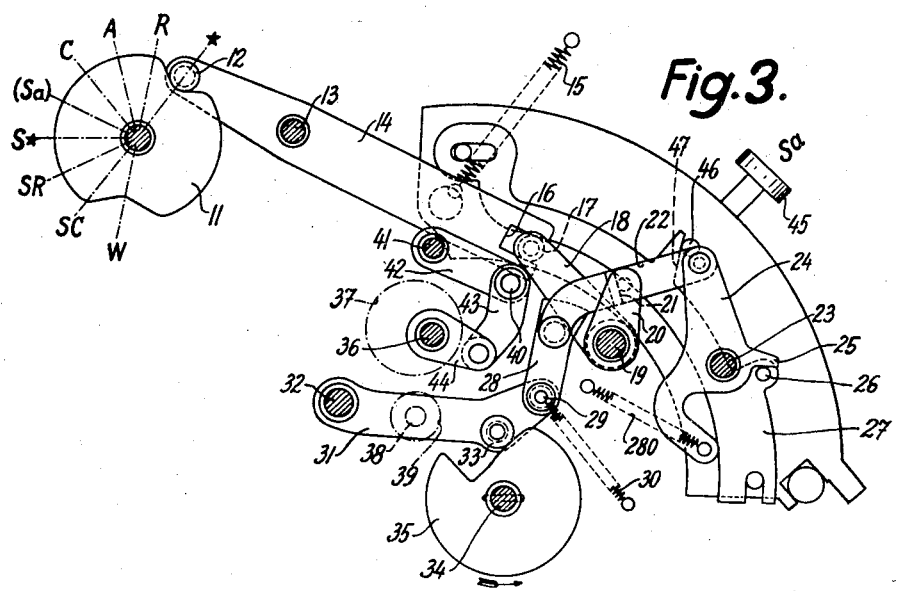
Inventor
Franz Ranglack
By
His Attorney May 16, 1939.　　　　　F. RANGLACK　　　　　2,158,150
CASH REGISTER, ACCOUNTING, AND THE LIKE MACHINE
Filed Oct. 14, 1935　　　3 Sheets-Sheet 2

Inventor
Franz Ranglack
By
His Attorney

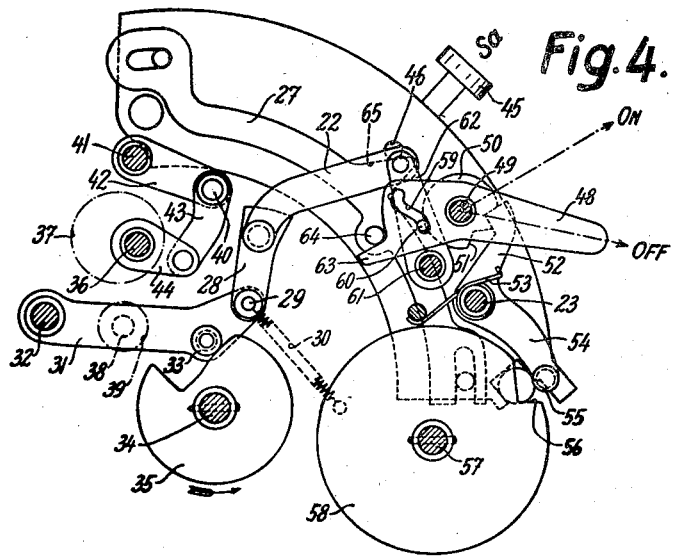
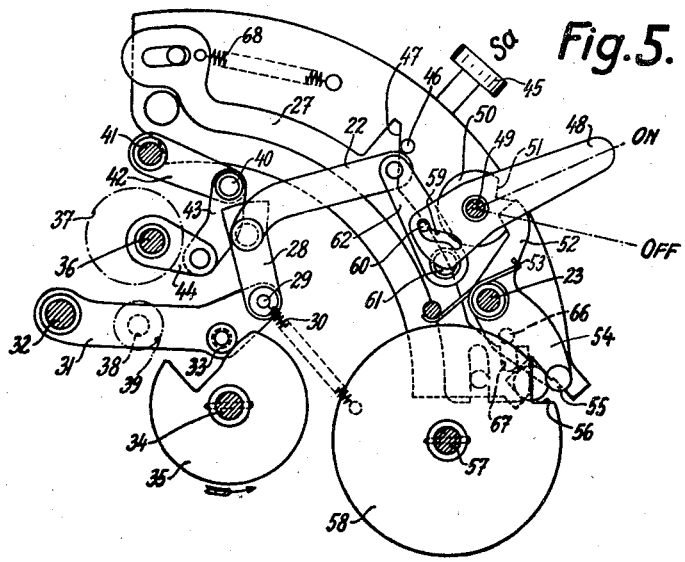

Patented May 16, 1939

2,158,150

UNITED STATES PATENT OFFICE 2,158,150

CASH REGISTER, ACCOUNTING, AND THE LIKE MACHINE

Franz Ranglack, Essen-on-the-Ruhr, Germany, assignor to The National Cash Register Company, Dayton, Ohio, a corporation of Maryland Application October 14, 1935, Serial No. 44,835
In Germany November 27, 1934

5 Claims. (Cl. 101—66)

The invention relates to a cash register, accounting and the like machine and more particularly to a check issuing device of such a machine adapted for single amount and multiple item transactions as shown and described in the copending United States application Serial No. 758,069 of December 18, 1934; Patent No. 2,116,779, issued to Ernst Breitling on May 10, 1938.

In such itemized check issuing machines a check issue disabling device is provided which is rendered effective in certain transactions.

The main object of the invention is to prevent disabling the check issue with a machine operation started.

Another object of the invention is to render the disabling means ineffective when entering a multiple item transaction, although they are effective in single amount transactions of the same kind.

Another object of the invention is to automatically lock settable means controlling said disabling means.

Further objects of the invention will be pointed out in the following detailed description with reference to the annexed drawings.

A preferred form of an embodiment of the inventon is shown in the annexed drawings.

Of said drawings,

Fig. 1 is a cross section through the printing and paper strip feeding device,

Fig. 3 is a side elevation of the check feeding device and the parts connected thereto, Figs. 4 and 5 show in side elevation two modified forms of the device according to Fig. 3.

Figure 2:
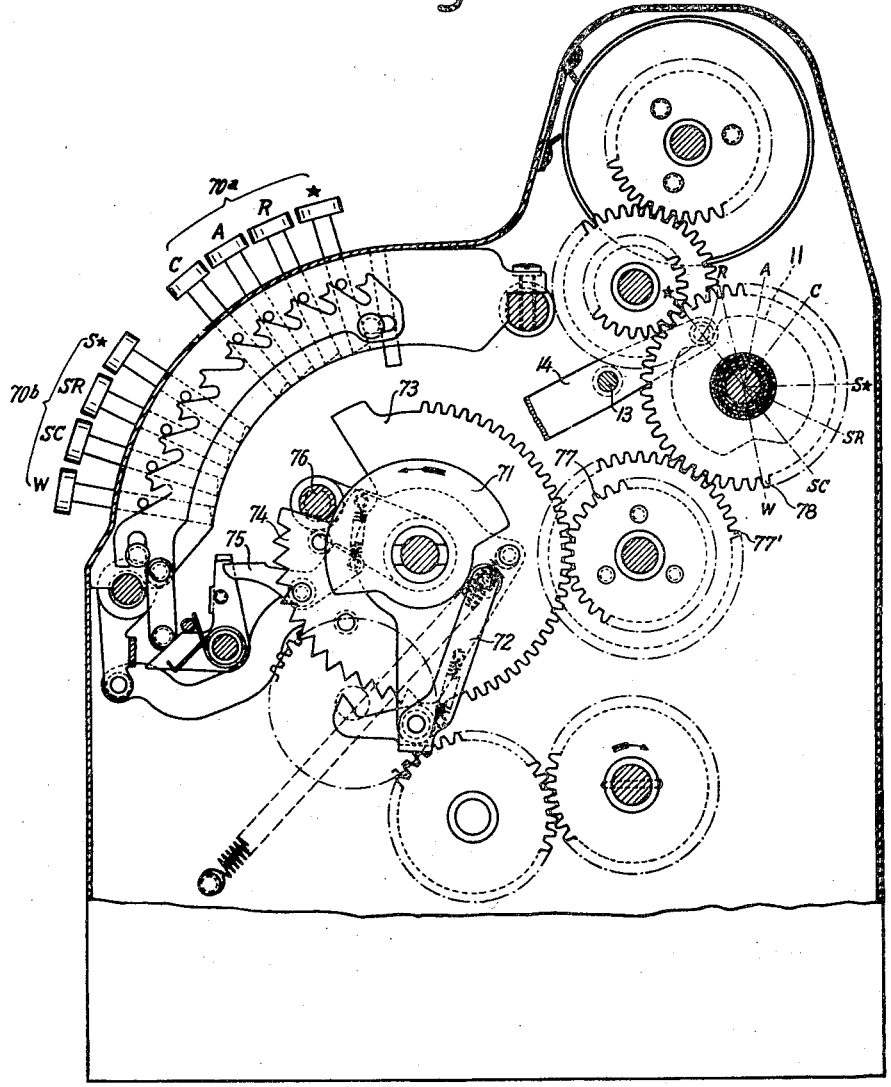
Fig. 2 shows in a side view a transaction key bank.

By the keys 10a, 10b (Fig. 2) of the transaction key bank when depressed a control disk 11 (Figs. 2 and 3) is adjusted by means of the differential members 71 to 78 (Fig. 2).

A lever 14 pivoted on a stationary stud 13, has arranged thereon a roller 12 bearing against the control disk 11 under the action of the spring 15. The right hand arm of the lever 14 has a slot 16 to receive a pin 17 of an arm 18 pivoted on cross rod 19. The said arm 18 is connected by a sleeve to an arm 20, a pin 21 of which extends into the path of a flange of a link 22. The right hand end of the link 22 is linked to an arm 24 pivotal at 23 and having an extension 25 engaging under the action of a spring 280 a pin 26 of a key controlled bar 27. The left hand end of the link 22 is joined to an intermediate link 28 pivoted on a stud 29 of an arm 31, pivoted on cross rod 32. Under the action of a spring 30 a roller 33 of the arm 31 engages the circumference of the cam disk 35 fast on the shaft 34.

For printing and issuing a check during a machine operation, an antifriction roll 37 (Figs. 1 and 3) eccentrically mounted on shaft 36 is pressed toward a feed roll 39 fast on shaft 38 by the link 28 rocked counter-clockwisely into the path of a stud 40, connecting an arm 42 pivoted on a cross rod 41 to a link 43. The lower end of the link 43 is pivotally connected to an arm 44 fast on shaft 36. When the link 28 is positioned as shown in Fig. 5 and during the following machine operation the shaft 34 with the cam disk 35 is rotated in counter-clockwise direction, the cam disk 35 rocks, through the medium of the roller 33, the arm 31 in counter-clockwise direction, the said arm causing, by means of the link 28 and the pin 40, the arm 42 and, by means of the link 43, the arm 44 and in connection therewith the shaft 36 to rotate in counter-clockwise direction. By this counter-clockwise rotation of the shaft 36 the antifriction roll 37 is pressed toward the feed roll 39, so that during the machine operation the rotated feed rolls 37, 39 advance the check strip 80 in relation to the printing hammer 81 (Fig. 1). When the link 28 is positioned as per Fig. 3 it can not carry along the parts 40, 42 to 44 when the arm 31 is rocked by the cam disk 35 in counter-clockwise direction during a machine operation. Thus the antifriction roll 37 is not enabled to be pressed toward the feed roll 39, so that also the check strip 80 is not fed to the printing point.

The check issue is disabled in that the roller 12 enters a recess in the control disk 11. In this position the control disk 11 is moved upon depressing of a "Cash" key (* Fig. 2). If, however, a key "Paid on account" (R), "Paid out" (A), "Charge" (C), "Cash total" (S*), "Total paid on account" (SR) and "Total charged" is depressed, a full portion of the control disk 11 is moved beneath the roller 12 (Fig. 3). Thereby the lever 14 is rocked clockwisely and the arms 18 and 20 counter-clockwisely. At this time the pin 21 of the arm 20 shifts the link 22 to the left and renders the link 28 effective, so that during the counter-clockwise rocking of the arm 31 the antifriction roll 37 is moved into effective position. A recess in the control disk 11 is moved beneath the roller 12 also then when the "No sale" key (W) has been depressed. Also in this case no check will be issued. Although for cash transactions, checks are not issued, checks are issued when entering multiple item transactions.

For multiple item transactions the multiple item key 45 has to be depressed. On the stem of this key 45 a pin 46 is arranged cooperating, when the key is depressed, with a bevelled edge 47 of the key detent 27 and moving it upward. Thereat its pin 26 rocks the nose 25 of the arm 24 and thereby the arm 24 itself in counter-clockwise direction against the action of the spring 280, moves the link 22 to the left, and the link 28 into the path of the pin 40. The multiple item key 45 is held depressed during the whole multiple item entry operation and is released only during the machine operation for taking the multiple-item total. Thus, with the structure shown in Fig. 3, a check is always issued in multiple item machine operations independent of the class of transaction.

According to the modified form of the invention illustrated in Fig. 4, the issue of checks for single amount sales may be effected at will by setting a control lever 48 to one of its set positions. The latter is pivoted on a stud 49 and has fixed a disk 50 the notches 51 of which can be engaged by a locking pawl 52 under the action of a spring 53. The extension 54 of the locking pawl 52 has attached thereto a roller 55 faced with the machine at rest, by recess 56 in a locking disk 58 fast on a shaft 57 enabling the control lever 48 to be displaced at will. When however, the machine is operated, an unmutilated portion of the locking disk 58 passes beneath the roller 55 and prevents the locking pawl 52 from moving in clockwise direction. Thereby the control lever 48 is latched in the position set to.

The control lever 48 has a curved slot 59 engaged by a pin 60 of an arm 62 pivoted on stud 61. The arm 62 has linked thereto the right hand end of the link 22. When the control lever 48 in "Off" position (compare Fig. 4), the link 28 is out of the path of the pin 40. When the control lever 48 is moved out of this position in counter-clockwise direction and into the "On" position, the cam slot 59 rocks the pin 60 and in connection therewith the arm 62 in counter-clockwise direction and moves the link 28 into the path of the pin 40.

In the modified construction shown in Fig. 4, the arrangement is made so that independent of the control lever 48 a check is issued for multiple item entry operations. For this purpose, the control lever 48 is provided with an extension 63 contacting, with the control lever 48 in "Off" position, a pin 64 of the key detent 27.

When initiating a multiple item entry operation the itemizing key 45 is depressed, and the pin 46 cooperating with a bevelled edge 65 of the key detent 27 moves the latter downward. The pin 64 acts upon the projection 63 of the control lever 48 being restored thereby in counter-clockwise direction to "On" position. Thus the control lever 48 is restored to "On" position each time an itemizing operation is initiated.

In the modified form as per Fig. 5 the issue of a check is not compulsory for any operation, but for multiple item entry operations the check printer is enabled and disabled at will. Provision is made only to the effect that the control lever is prevented from being displaced during a multiple item entry operation. In this manner the issue of defective checks is prevented because once a multiple item entry is begun, the check feed cannot be changed from "Off" to "On" or vice versa.

For this purpose on the projection 54 of the locking pawl 52 a pin 66 is arranged. Upon depressing the multiple item key 45, the pin 46 cooperating with the sloped edge 47 moves the key detent 27 upward against the action of its spring 68. Thereat, a recess 67 of the key detent 27 engages the pin 66 of the locking pawl 52 thus preventing the control lever 48 from being displaced during the machine operations pertinent to a multiple item entry operation.

While the form of mechanism herein shown and described, is admirably adapted to fulfill the objects primarily stated, it is to be understood that it is not intended to confine the invention to the embodiments herein disclosed, for it is susceptible of embodiment in various other forms all coming within the scope of the claims which follow.

What is claimed as new is:

1. In a machine capable of receiving single item and multiple item transactions, the combination of transaction keys, a multiple item key, a check issuing means, a mutilated disk differentially set under control of the transaction keys, an interponent set into effective position under control of said disk when a check is to be issued by said check issuing means and into an ineffective position when no check is to be issued, means to operate the interponent to render the check issuing means effective, and means adjustable by the depression of the multiple item key to move the interponent into effective position when set into ineffective position under control of the mutilated disk and transaction keys, whereby a check is always issued upon entering a multiple item transaction.

2. In a machine of the class described, the combination of transaction keys, a manipulative device, a normally disabled check issuing means, means to render the check issuing means effective including an interponent movable into effective or ineffective position, means adjusted under control of the transaction keys to determine the position of the interponent, and means adjusted directly by the manipulative device prior to a machine operation to move the interponent into effective position, whereby the check issuing means issues a check whenever the machine is operated with the manipulative device operated.

3. In a machine of the class described, in combination with transaction keys, a control key, a check issuing means including a feed roller adjustable into and out of feeding position, and a mutilated disk differentially set under control of the transaction keys, of an eccentric bearing for said feed roller; connections to rotate the eccentric bearing to move the feed roller into and out of feeding position; a cam operable one rotation for each machine operation; an interponent operable by the cam during each machine operation; means set under control of the mutilated disk to move the interponent either into or out of cooperating relation with the said connections; and means between the control key and the interponent to directly readjust the interponent when the interponent is set out of cooperating relation with said connections to move the interponent into cooperating relation with said connections, whereby the feed roller is moved into the feeding position by the cam to cause a check to be issued when said mutilated disk positions the interponent for issuing no check.

4. In a machine of the class described, in combination with a transaction bank of keys, a normally disabled check feeding mechanism including a feed roller, and an adjustable bearing for said feed roller to adjust the feed roller into and out of feeding position, of means operable during every machine operation, said means capable of adjusting the bearing into position to adjust the feed roller into feeding position; means set under control of the transaction keys to control the effectiveness of the first-named means; a manipulative device; and means adjusted directly by the manipulative device to supersede the control of the transaction keys over the first-named means whereby the said feed roller is set to issue a check, said last-named means being operated prior to the machine operation.

5. In a machine of the class described, in combination with a transaction bank of keys, a check feeding mechanism including a feed roller, and a cam disk adjustable under control of said transaction keys, of a movable support for said feed roller to move the feed roller into and out of feeding position; moving means for the support; means adjustable by the cam disk as controlled by the transaction keys for controlling the moving means to thereby control the effectiveness of the check feeding mechanism; a special key; a bar operated directly by the special key; and connections between the bar and the control means to render the moving means effective to cause the check feeding mechanism to operate when the special key is depressed.

FRANZ RANGLACK.